(12) United States Patent
Homyk

(10) Patent No.: US 8,320,147 B2
(45) Date of Patent: *Nov. 27, 2012

(54) PORTABLE DEVICE FOR GENERATING TWO PHASES FROM A SINGLE ELECTRICAL PHASE

(75) Inventor: William Alan Homyk, Hopewell Junction, NY (US)

(73) Assignee: Consolidated Edison Company of New York, Inc., New York, NY (US)

( * ) Notice: Subject to any disclaimer, the term of this patent is extended or adjusted under 35 U.S.C. 154(b) by 589 days.

This patent is subject to a terminal disclaimer.

(21) Appl. No.: 12/559,007

(22) Filed: Sep. 14, 2009

(65) Prior Publication Data

US 2010/0020506 A1    Jan. 28, 2010

(51) Int. Cl.
  *H02M 5/06* (2006.01)
  *H02M 5/10* (2006.01)
(52) U.S. Cl. .......................................... 363/154; 363/153
(58) Field of Classification Search .................. 363/142, 363/143, 146, 148, 149, 152–154; 323/355, 323/358, 359
  See application file for complete search history.

(56) References Cited

U.S. PATENT DOCUMENTS

| | | |
|---|---|---|
| 4,644,241 A | 2/1987 | Maeda |
| 5,051,867 A | 9/1991 | Burgher et al. |
| 5,084,812 A | 1/1992 | Hausler et al. |
| 5,545,965 A | 8/1996 | Smith |
| 5,905,367 A | 5/1999 | Hochgraf |
| 6,166,531 A | 12/2000 | Hogan et al. |
| 6,456,180 B1 | 9/2002 | Moore |
| 7,212,419 B2 * | 5/2007 | Vinciarelli ...................... 363/65 |
| 7,940,540 B2 * | 5/2011 | Vinciarelli ................... 363/125 |

FOREIGN PATENT DOCUMENTS

| | | |
|---|---|---|
| CH | 345947 | 4/1960 |
| EP | 0561031 | 9/1993 |
| GB | 1165613 | 10/1969 |

OTHER PUBLICATIONS

International Search Report mailed Jun. 22, 2010 for App. PCT/US20081074373.
Written Opinion of the International Searching Authority mailed Jun. 22, 20101 for App. PCT/US2008/074373 (filed Aug. 27, 2008).
Web page for ServiSaver equipment, VON Corporation, http://www.voncorp.com/products/servsav/15&20&m.htm, accessed Aug. 18, 2009.

* cited by examiner

*Primary Examiner* — Matthew Nguyen
(74) *Attorney, Agent, or Firm* — Cantor Colburn LLP

(57) ABSTRACT

A portable device for generating two electrical phases from a single electrical phase. The portable device includes a watertight housing having a toroidal transformer therein. A terminal block is mounted within the housing and is electrically connected to the toroidal transformer. The portable device is sized to fit on the rear floor of a vehicle and an appropriate weight to be carried by a single person.

19 Claims, 12 Drawing Sheets

PORTABLE DEVICE FOR GENERATING TWO PHASES FROM A SINGLE ELECTRICAL PHASE

CROSS REFERENCE TO RELATED APPLICATIONS

The present application is a continuation-in-part of U.S. patent application Ser. No. 11/850,075 entitled "Portable Device for Generating Two Phases from a Single Electrical Phase" filed on Sep. 5, 2007, which is incorporated herein in its entirety.

BACKGROUND OF THE INVENTION

The present invention relates generally to a portable device for creating a second electrical phase from a single phase and in particular to a portable device that creates a second phase of electricity from a single-phase source.

Residential homes typically have three conductors entering the building from the street utility electric lines. Two of the conductors are power conductors each carrying a single phase of electricity, meaning the waveforms of the electricity on the two conductors are typically out of phase by 180 degrees. The third conductor entering the building is what is known as a neutral phase, which connects to earth ground. While the neutral may carry current, it normally will have no electrical potential or voltage. Each phase of the power conductors connects with one branch of 120V circuits within the building. Where 240V is required, for a stove or electric clothes dryer for example, both power conductors are used for that circuit.

Occasionally, an issue will arise with one of the three conductors going into the building. For example, the conductor may break or short causing a loss of electrical power on that conductor while the others continue to function. In this instance, the building will still receive electrical power, but on only one of the phases. Issues may arise if the conductor cannot be promptly repaired, as may be the case when power is lost in the conductor during the middle of the winter and the frozen ground cannot be excavated to remove and replace the cable. Until the cable is replaced, the building will be without full use of the electrical circuits, and a user may not be able to use appliances such as a stove, clothes dryer, or air conditioner.

Where the cable cannot be readily repaired, electric utilities often resort to running another conductor from a separate service, such as a light pole to the building. Often this involves suspending the cable in the air with temporary braces which are time consuming to construct and unsightly. Also, this temporary conductor is typically not connected to the buildings electric meter resulting in a loss of revenue. Alternatively, the utility may use a technique known as "bridging" that connects the one good phase to both circuits of the building. However, the bridging technique may not allow use of certain appliances due to a lack of voltage since both circuits are in phase with each other at 120V.

While existing systems and methods for providing two phase electrical service are suitable for their intended purposes, there still remains a need for improvements particularly regarding the creating of a second electrical phase with a portable device that may be readily deployed and installed in the field.

SUMMARY OF THE INVENTION

In accordance with one aspect of the invention, a portable device for generating two electrical phases from a single phase is provided. The portable device includes a housing sized and of an appropriate weight to be carried by a single person. A handle is movably coupled to the housing. A first and second phase inputs are mounted within the housing. A toroidal transformer mounted within the housing, the toroidal transformer being electrically coupled to the first and second phase inputs. A switch is electrically coupled to the first and second phase inputs.

In accordance with another aspect of the invention, another portable device for generating two electrical phases from a single phase is provided. The portable device includes a housing sized and of an appropriate weight to be carried by a single person, the housing having a first end, a second end opposite the first end and a side with an opening. A handle is arranged having a handle portion and an arm, the arm being movably coupled to the housing adjacent the first end. A wheel is coupled to the second end. A plurality of phase inputs are mounted within the housing adjacent the opening. A toroidal transformer is mounted within the housing, the toroidal transformer being electrically coupled to the plurality of phase inputs. A plurality of phase outputs are mounted within the housing adjacent the opening and electrically coupled to the toroidal transformer opposite the plurality of phase inputs.

BRIEF DESCRIPTION OF THE DRAWINGS

Referring now to the drawings, which are meant to be exemplary and not limiting, and wherein like elements are numbered alike.

DETAILED DESCRIPTION

Figure 1:
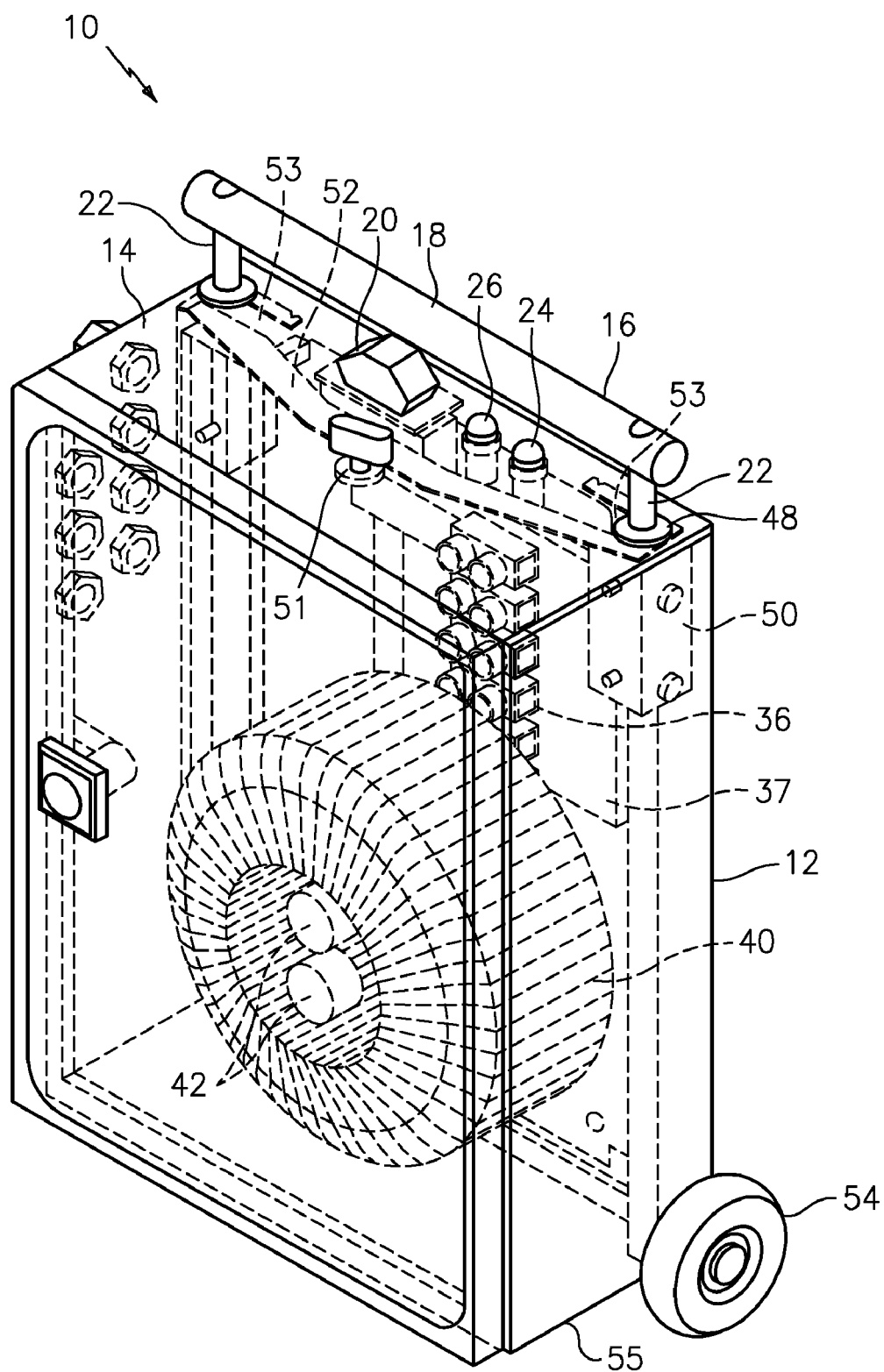
FIG. 1 is an illustration in perspective view of an embodiment of a portable two-phase electrical generation device.
Figure 2:
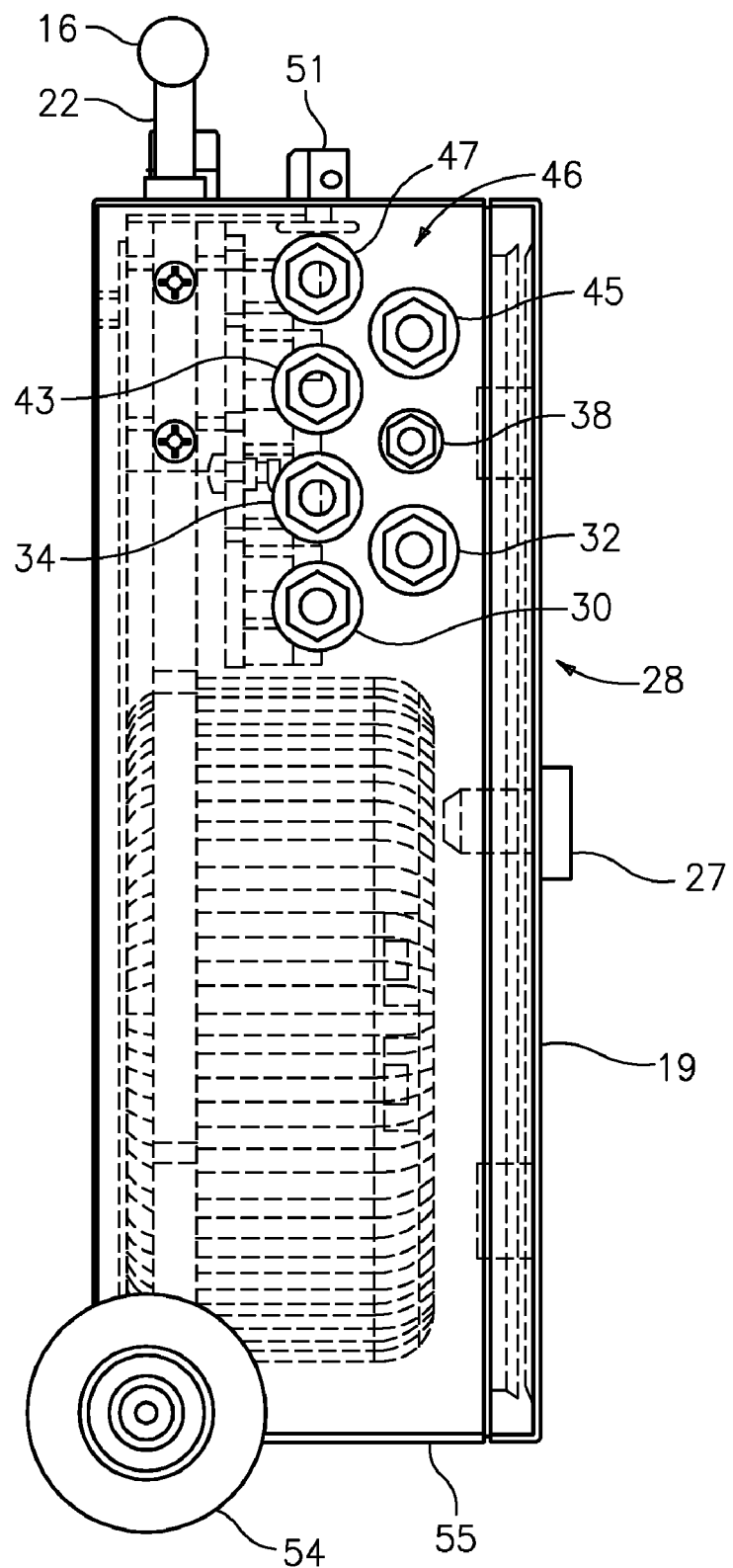
FIG. 2 is a side plan view illustration of the portable two-phase electrical generation device of FIG. 1.
Figure 3:
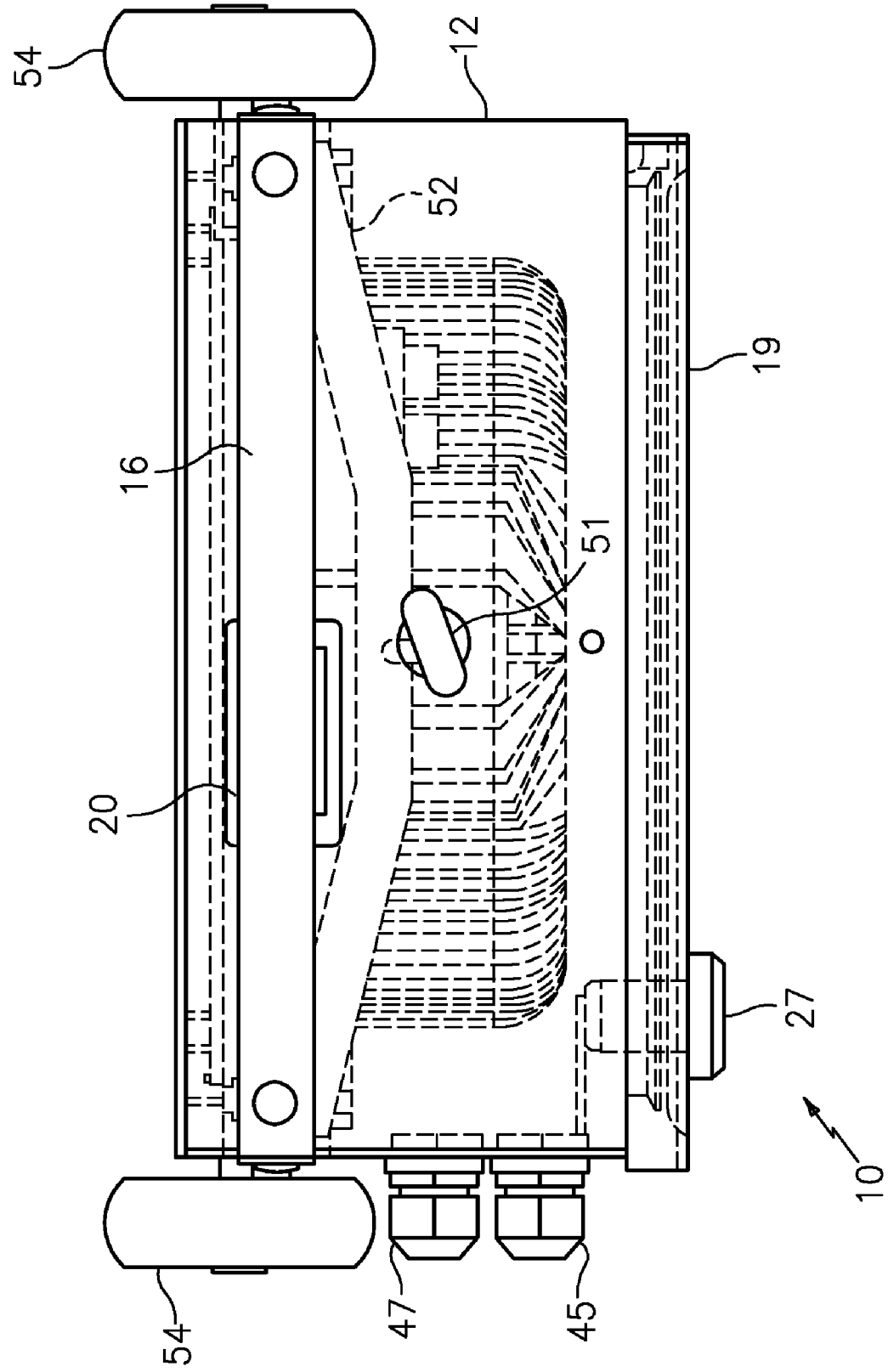
FIG. 3 is a top plan view illustration of the portable two-phase electrical generation device of FIG. 1.
Figure 4:
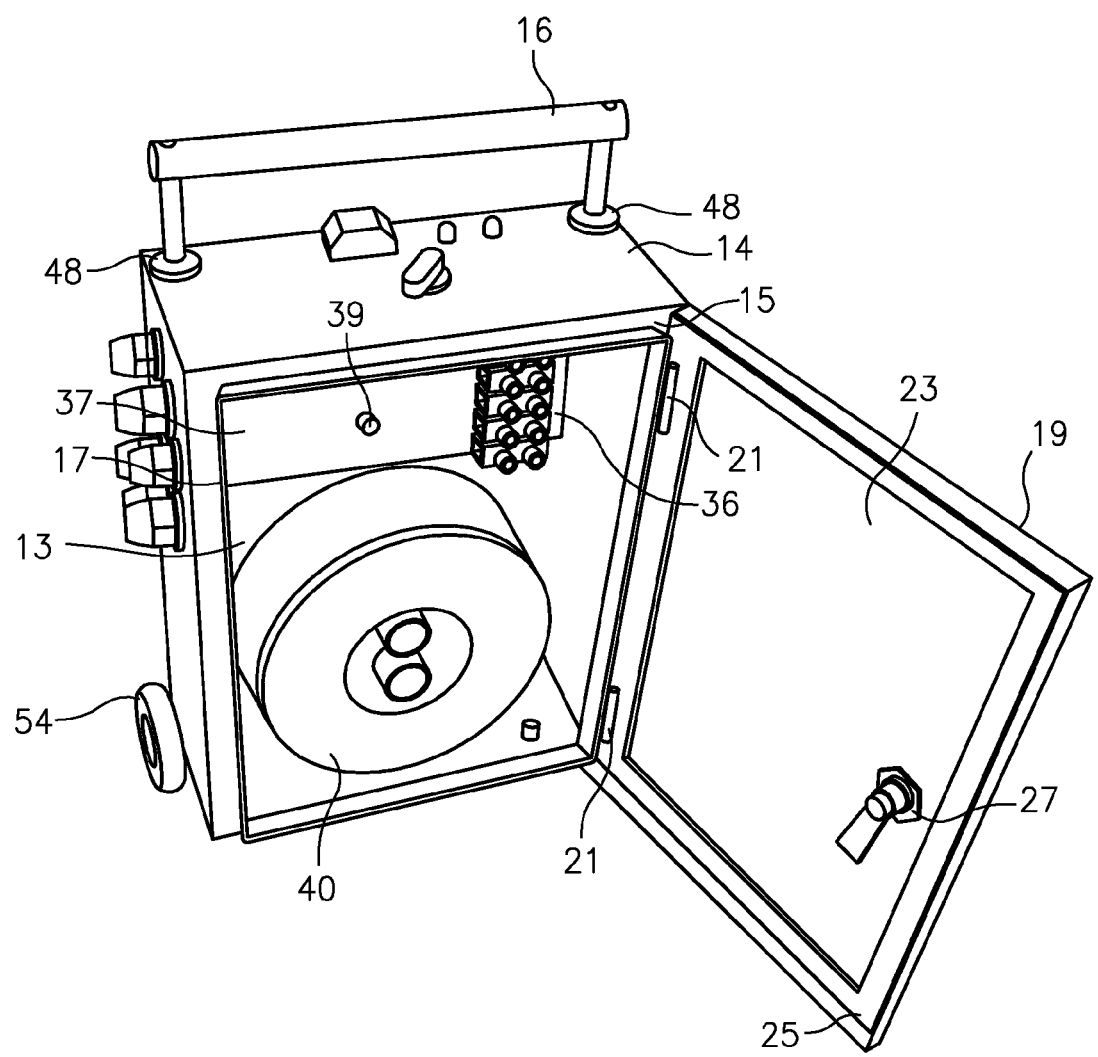
FIG. 4 is a perspective view illustration of the portable two-phase electrical generation device of FIG. 1 with the door open.
Figure 5:
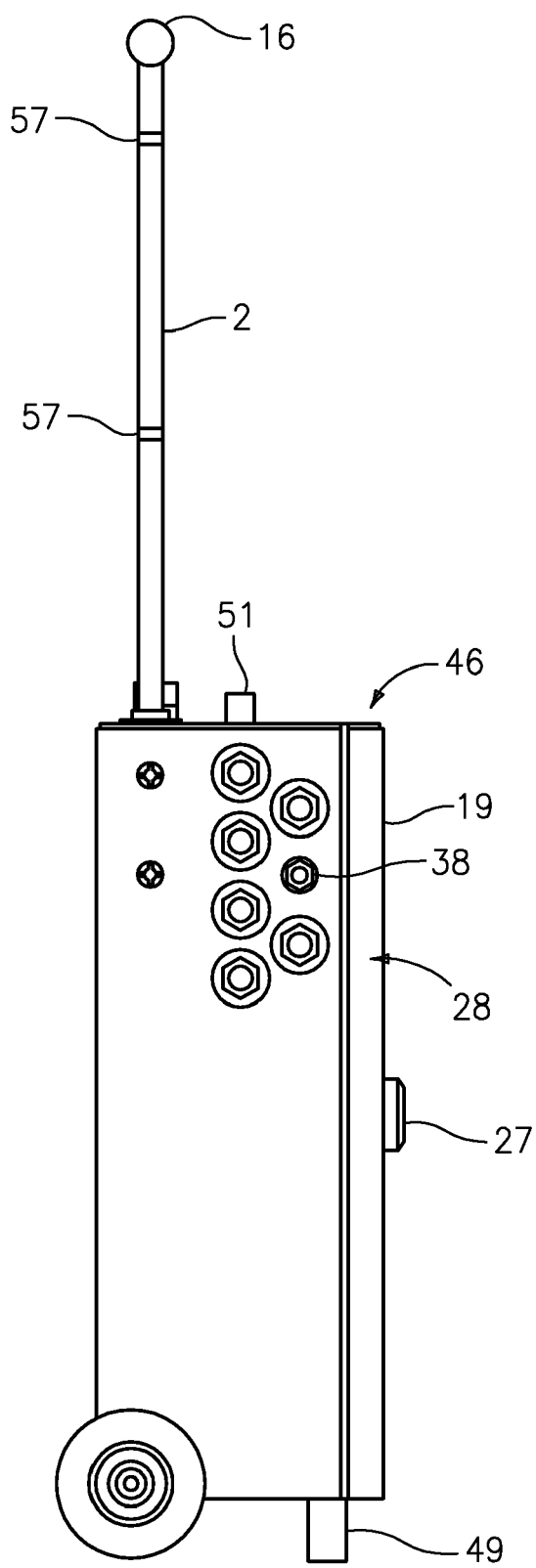
FIG. 5 is a side plan view illustration of the portable two-phase electrical generation device of FIG. 1 with the handle in the extended position.

FIGS. 1-5 illustrate an exemplary embodiment of a portable two-phase electrical generation device 10. The portable device 10 includes a housing 12 having a first end 14. A handle 16 having a handle portion 18 and a pair of arms 22 is coupled to the first end 14. As will be discussed in more detail below, the handle 16 is coupled to the housing 12 and movable between a first retracted position (FIG. 1) and a second extended position (FIG. 5). The housing 12 may be made from any suitable material, such as steel, aluminum, or non-conductive composite material or the like for example, that is durable enough to withstand repeated deployment of the portable device 10. In the exemplary embodiment, the housing 12 includes a generally hollow interior having an opening 13 on a side 15 (FIG. 4). A flange 17 extends about the periphery of the opening 13.

Coupled to one side of the opening 13 is a door member 19. The door 19 is coupled to the housing 12 by one or more hinges 21. The door 19 includes a recessed area 23 that is sized to receive the flange 17. A gasket 25 is arranged in the recessed area 23. The gasket 25 cooperates with the flange 17 when the door is in the closed position to form a watertight seal. In the exemplary embodiment, the gasket is made from neoprene foam rubber. The door 19 may also include one or more means for securing the door, such as a lock 27, to prevent unauthorized access to the interior of the device 10.

A switch 20 is mounted to the first end 14. In the exemplary embodiment, the switch 20 is a magnetic-hydraulic circuit breaker or magnetic-electronic circuit breaker with having adjustable trip characteristics and a waterproof boot. The circuit breaker includes mechanisms for automatically switching to an off-position in the event of an undesirable electrical condition such as high current levels for an extended period of time.

It is contemplated that other types of switches 20 may also be used, including but not limited to: a single-pole single-throw; a single-pole double-throw; a single-pole change-over; a double-pole single-throw; a double-pole single-throw; a double-pole double-throw; a hall-effect; a toggle; or an inertial switch. Alternatively, in some applications, it may be advantageous to provide remote activation of switch 20. Where remote activation is desired, the switch 20 may include, but not limited to: a remote controlled circuit breaker; a circuit breaker with a shunt trip; a contactor or a relay.

A pair of visual indicators, such as LED's for example, is also mounted on the first end 14. The visual indicators may include an on-off status indicator 24 and an overload status indicator 26. The status indicators 24, 26 are electrically connected to the switch 20 to provide the operator a visual means of determining the operating state of the portable device 10. In the exemplary embodiment, the overload status indicator 26 is triggered to an "on" indication when a thermal overload condition is detected by the switch 20, this may occur if too many electrical appliances are connected to the portable device 10 for example. The over load condition is detected by the switch 20, which open cause the flow of electrical power through the portable device 10 to cease. In one embodiment, the status indicators 24, 26 and the switch 20 are arranged between the handle portion 18 and the first end 14 to provide protection for the status indicators 24, 26 and the switch 20 against damage from external objects during transportation and operation.

A plurality of input pass-through fittings 28 are mounted on one side of the housing 12. The plurality of input pass-through fittings 28 includes three fittings, A-phase fitting 30, Neutral fitting 32, and B-Phase fitting 34 to receive input electrical conduits. Each of the fittings 30, 32, 34 includes a means, such as a grommet for example, for allowing the electrical cables to pass into the housing 12 while maintaining a seal to prevent the entry of water. A ground connector fitting 38 is also mounted to the housing 12 to provide a means for allowing an electrical connection to enter the housing 12 that electrically couples the portable device 10 to earth, such as through a building grounding wire or to a water pipe for example. In the exemplary embodiment, the each of the plurality of input pass-through fittings 28 is an IEC 60309 cable connector, such as model PG11 manufactured by Nante for example.

A toroidal transformer 40 is mounted to the housing 12 by a pair of bolts 42. The bolts 42 pass through a plate 44 (FIG. 7) that captures the toroidal transformer 40 against the housing 12. A plurality of output pass-through fittings 46 are mounted to the housing 12 adjacent the plurality of input pass-through fittings 28. Similar to the plurality of input pass-through fittings 28, the plurality of output pass-through fittings 46 include three fittings 43, 45, 47 to receive electrical conductors from the load, the building's load center or the electric meter socket for example, for the A-phase, neutral, and B-phase respectively. The plurality of output pass-through fittings 46 will also include a seal, such as a grommet for example, for allowing the electrical cables to pass into the housing 12 while maintaining a seal to prevent the entry of water.

Within the housing 12, a terminal block 36 is arranged to receive the cables that enter through the plurality of input pass-through fittings 28 and the plurality of output pass-through fittings 46. The terminal block 36 electrically couples the toroidal transformer 40 with the input and output cables as discussed below. The terminal block 36 includes fasteners and lugs to allow the cables to be securely mounted. A plate 37 electrically insulates the front portion of the housing 12 interior from the rear portion. In the exemplary embodiment, the plate 37 is made from an electrical insulator such as phenolic thermosetting resin. In the exemplary embodiment, the plate 37 is 0.25 inches (0.625 centimeters). A ground lug 39 is mounted to the plate 37 adjacent the terminal block 36.

The handle arms 22 pass through the first end 14 into the interior of the housing 12. A grommet 48 provides a seal to prevent the entry of water into the interior of housing 12. The arms 22 are coupled to a frame member 50 that is mounted within the interior of housing 12. In the exemplary embodiment, the frame member 50 has sufficient length to provide a stable sliding motion when the handle 16 is moved from the first retracted position (FIG. 1) to the second extended position (FIG. 5). A lever 51 is rotatably coupled to the first end 14. The lever 51 is connected to the middle portion of slide member 52. Slide member 52 includes slots 53 arranged on the ends that are sized to engage the arms 22. The slide member 52 moves in response to the rotation of the lever 51 is rotated between a first (FIG. 1) and second position (FIG. 4). The slots 53 engage features, such as slots 57 on the arms 22 to secure the handle 16 in a desired position.

A pair of wheels 54 are mounted to the housing 12 adjacent a second end 55. The wheels 54 are arranged to allow the portable device 10 to be rolled rather than carried during transportation. The wheels 54 offset the second end 55 from the ground. In some embodiments, a stand 49 is coupled to the second end 55 to assist the portable device 10 in maintaining an upright position.

Figure 6:
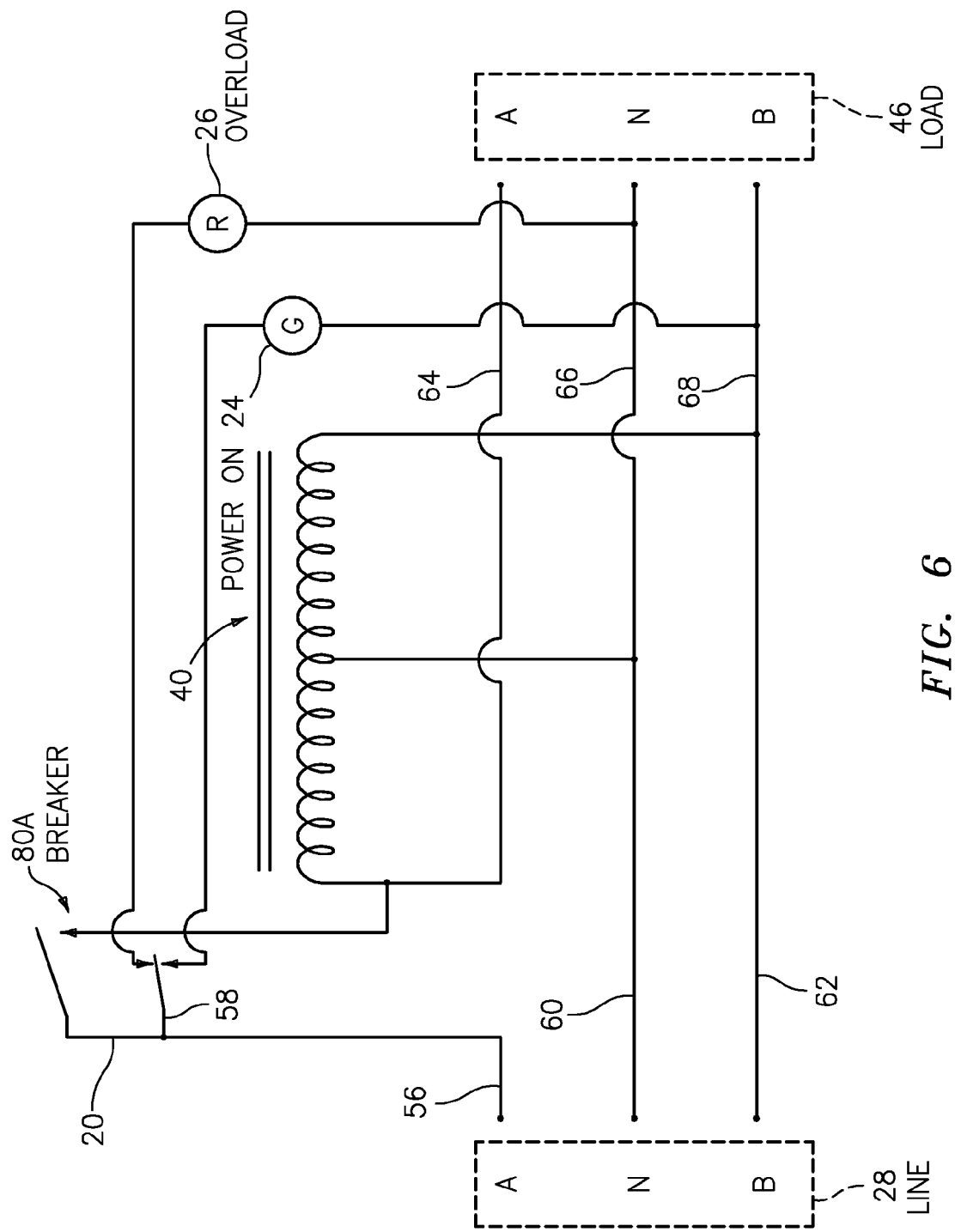
FIG. 6 is a schematic illustration of a portable two-phase electrical generation device of FIG. 1.

The components of portable device 10 are electrically coupled as illustrated in FIG. 6. In the exemplary embodiment, the A-phase is connected to A-phase cable 56 and coupled to the toroidal transformer 40 via switch 20. A relay 58 internal to switch 20 electrically couples the status indicators 24, 26 to the switch 20 and is movable between an on-position wherein electrical power flows to on-off status indicator 24 and an overload position connecting the overload status indicator 26 to the electrical circuit. It should be appreciated that while the relay 58 is illustrated in the exemplary embodiment as being internal to the switch 20, the relay 58 may also be incorporated as a separate component. In operation, when an overload condition is sensed by switch 20, the switch 20 switches to the tripped or off position that disconnects power to the terminal block 36. When this occurs, the internal relay 58 switches to the overload position-causing overload status indicator 26 to illuminate. When the switch 20 is reset, the internal relay 58 switches to the on-position.

The neutral cable 60 and B-phase cable 62 are connected to the input or primary side of toroidal transformer 40. Cables 64, 66, 68 connect to the load or secondary side of the toroidal transformer 40 to the A-phase, neutral and B-phase input terminals in terminal block 36 respectively. In the exemplary embodiment, the toroidal transformer 40 includes three taps with the A-phase cables 56 and B-phase cable 62 being connected to the ends of the toroidal transformer 40 and the neutral cable 60 being connected to a center tap. It should be appreciated that while the windings of the toroidal transformer 40 are described with a single winding having a primary and a secondary side, other transformer constructions, such as but not limited to a transformer having a separate primary winding and secondary winding may also be used.

Figure 7:
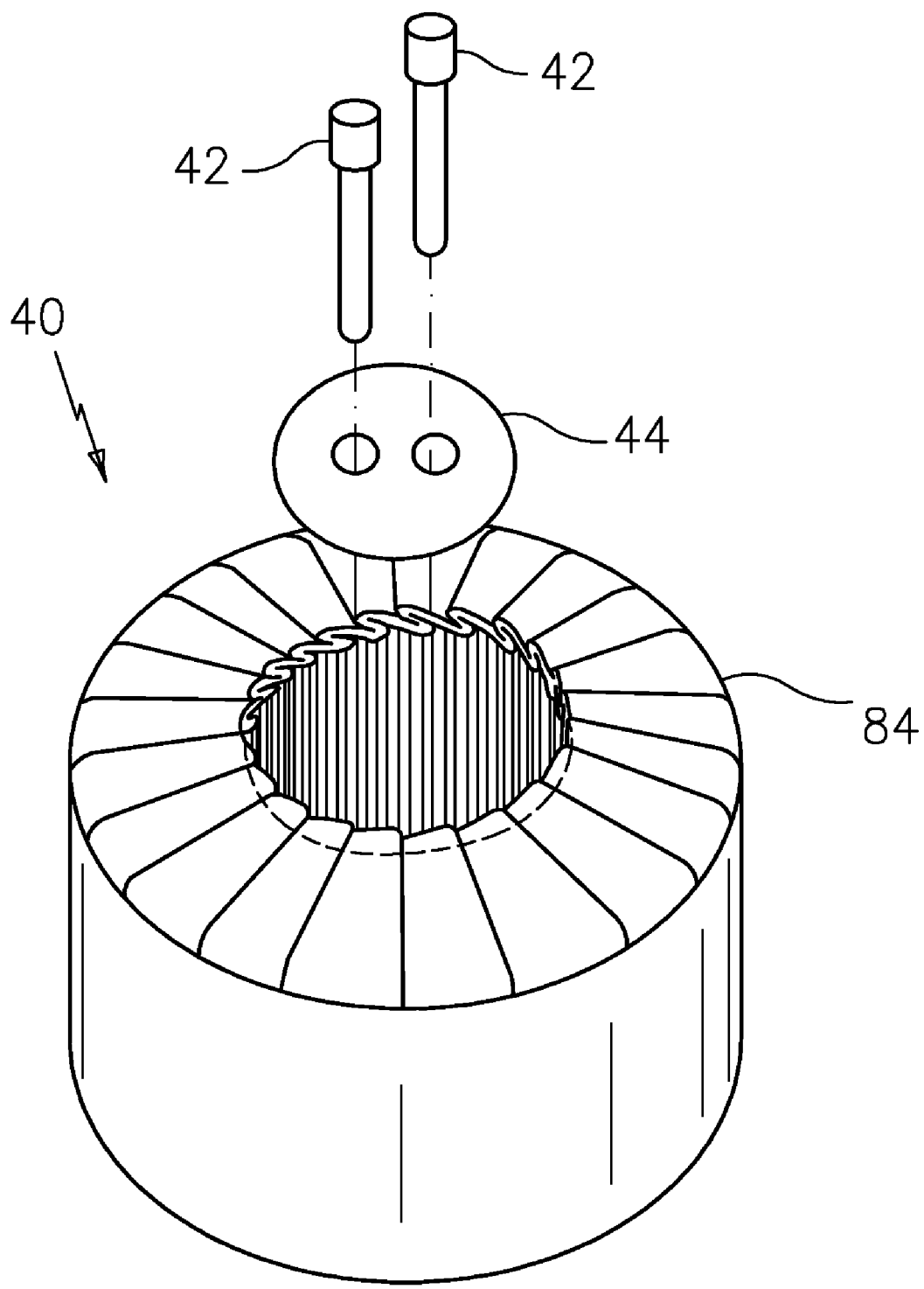
FIG. 7 is an illustration of an embodiment of the toroidal transformer used in the portable two-phase electrical generation device of FIG. 1.
Figure 8:
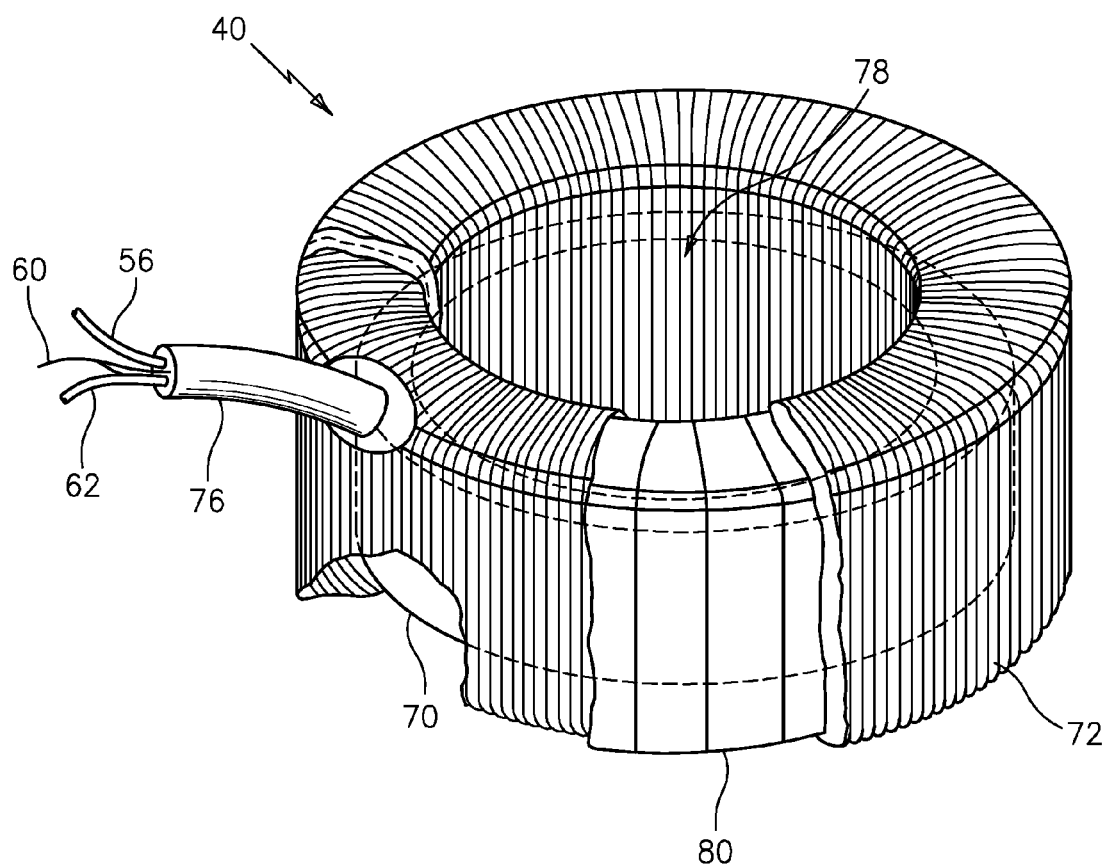
FIG. 8 is an illustration partially in section, of an embodiment of the toroidal transformer of FIG. 7.

A typical toroidal transformer 40 is described in more detail with reference to FIG. 7 and FIG. 8. The toroidal transformer 40 includes a core 70 that is covered by an insulation material (not shown). A winding 72 with lead cables A-phase cable 56, neutral cable 60 and B-phase cable 62 and an insulation sleeve 76 is wrapped around the cross section of core 70 and distributed along the circumference of the core 70. This is typically done in a toroidal winding machine by threading a circular winding head with a magazine for storing magnet wire through a center hole 78 in core 70, then storing magnet wire on the magazine, and finally rotating the winding head around the core 70 through the center hole 78 while pealing copper wire off the magazine. The core 70 is rotated slowly about the toroidal axis during winding, so the wire is distributed along the circumference of the core 70.

An insulation portion 80 separates the winding 72 from the transformer core 70. The insulation portion 80 is typically a strip of plastic film that is wrapped in several layers over the transformer core 70. The strips are overlapped laterally to provide creep insulation across the strip. Insulation portion 80 is typically made from a plastic such as, but not limited to polyethylene terephtalate (PEPT) film. The winding 72 is wound on top of the insulation portion 80. A final insulation layer 84 is wrapped around the winding 72 for protection. Alternatively, the toroidal transformer may be potted in plastic to provide the final insulation layer.

The portable device 10 may be used in a variety of applications. For example, in the event that a residential building experiences a loss of electrical power in one of the conductors between the street utility line and the home's electrical load center. The portable device 10 may also be used in other applications where two-phase electrical power is required, but only a single electrical phase is available. For example, portable air conditioning units are sometimes used to cool utility transformers during hot summer months to prevent overheating or the charging of electric vehicles. Other examples include, but are not limited to, the use of the portable device 10 with power parked police mobile command centers, recreational vehicles, or refrigerated trucks; thereby eliminating the unnecessary expense, air pollution, and noise associated with running the engines on these units or external electrical generators powered by petroleum fueled engines.

To provide power to the air conditioner, the utility must find two separate electrical phases. Often this requires combining electrical power from multiple sources. Typically one source will be readily available, such as a streetlight for example, however, to provide the second source with a different phase usually entails finding a less available power source, such as an electrical conduit located in a manhole below street for example. Finding a second electrical phase often requires installing electrical conductors over extended distances which is inconvenient to both the operators and those who live and work nearby since the conductors need to be appropriately barricaded.

Where a second electrical phase is needed, the portable device 10 may be connected to an available electrical phase to produce the necessary two electrical phases. Using a lost conductor from the utility street electric line as an example, a technician would first be dispatched to diagnose the problem. Upon determining that electrical power has been lost in one of the conductors, the technician would isolate the failed conductor until repairs could be made. The technician would then connect the de-energized but good single-phase conductor to the A-phase terminal and the neutral phase to the neutral input terminal of terminal block 36. The non-live conductor may be connected to the B-Phase terminal.

Conductors are then connected between A-phase, B-phase and neutral connections in the buildings load center, or electric meter socket, and the corresponding output terminals on the terminal block 36 to complete the power connection between the street utility electric line and the buildings load center. It should be appreciated that this connection is advantageous to the electric utility since the connection may be made after the electrical meter on the building, allowing the utility to continue to collect revenue from the customer and without disturbing or removing the meter from its socket. Once the live conductor is energized, and the switch 20 is moved to the on position, electricity from the live conductor passes through the terminal block 36, A-phase cable 56 and into the toroidal transformer 40. In the exemplary embodiment the toroidal transformer 40 will have a turn ratio of 2:1 and a power rating of 6 kW-10 kW, and more preferably a power rating of 8 kW. The toroidal transformer 40 provides an electrical power to both the A-phase cable 64 and B-phase cable 68. In the exemplary embodiment where the turn ratio is 2:1, the portable device will provide electrical service for each circuit of the building at 120V, 60 A, with the electrical waveform of the A and B phases being 180 degrees apart.

The portable device 10 may also be used in an instance where there is an issue with the neutral cable between the building and the street utility electrical lines. In this embodiment, the technician connects the A-phase and B-phase conductors from the street utility line are connected to the A-phase and B-phase terminals in terminal block 36. The load or output side is connected to the building load center as described above. The neutral terminal of terminal block 36 is connected to a suitable ground to provide a neutral connection for the building.

In practice, the portable device 10 may need to be deployed into the field in less than desirable circumstances. Since the portable device 10 may be used to restore electrical service to a residential building, the portable device must be of such a size to allow easy transportation and installation. In the exemplary embodiment, the portable device 10 is sized to fit on the rear seat, or rear floor of a vehicle such as a standard sized sedan. It is also desirous for the portable device to be transported by a single person so that a single technician may be dispatched to perform the repair. In the exemplary embodiment, the portable device 10 is an appropriate weight to be carried by a single person. In one embodiment, the portable device 10 weighs less than 65 lbs. Further, since it is likely that the portable device 10 will be installed in a utility room, typically located in a basement, a small size and weight will facilitate deployment in building that requires traversing narrow hallways and staircases.

Figure 9:
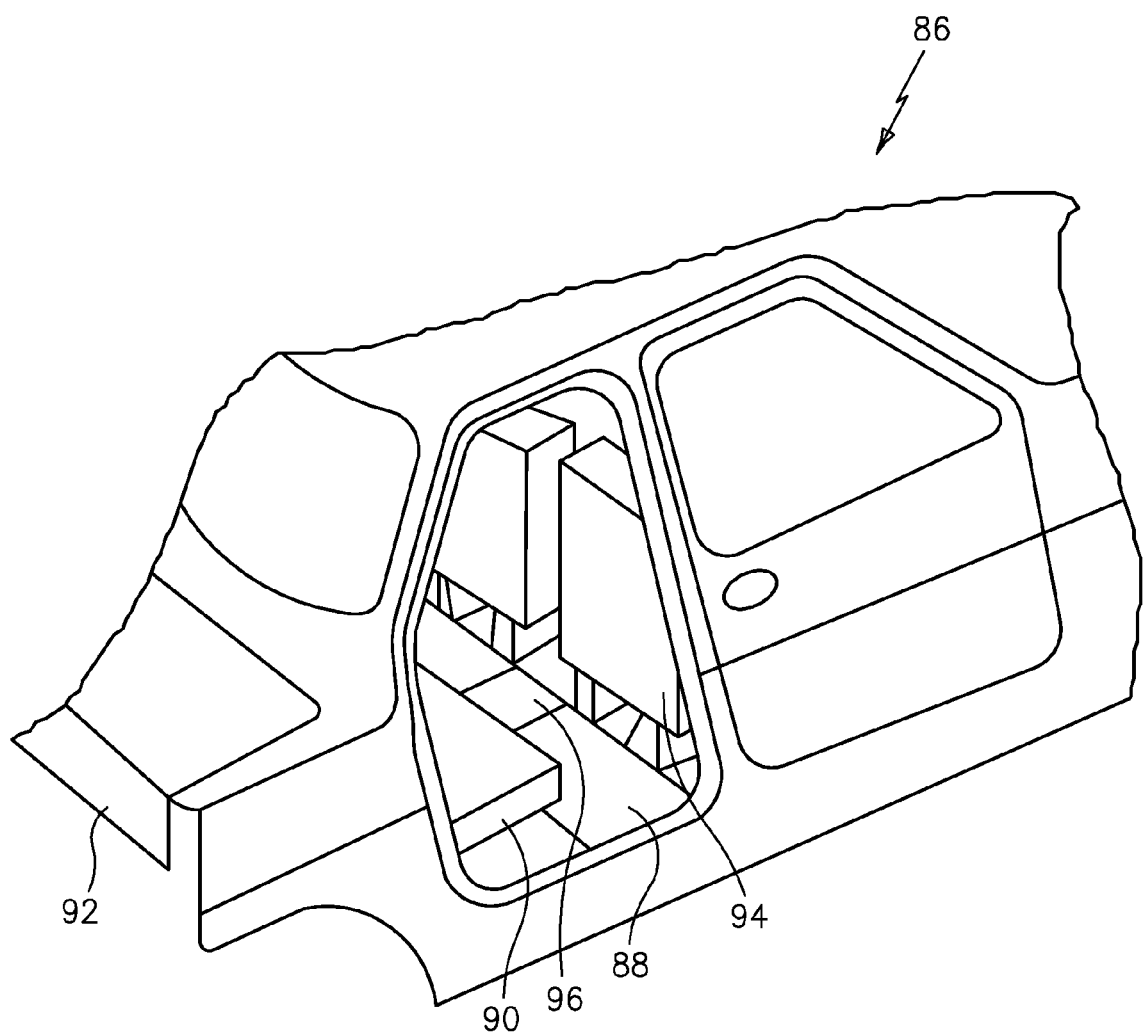
FIG. 9 is an illustration of a portion of a vehicle.
Figure 10:
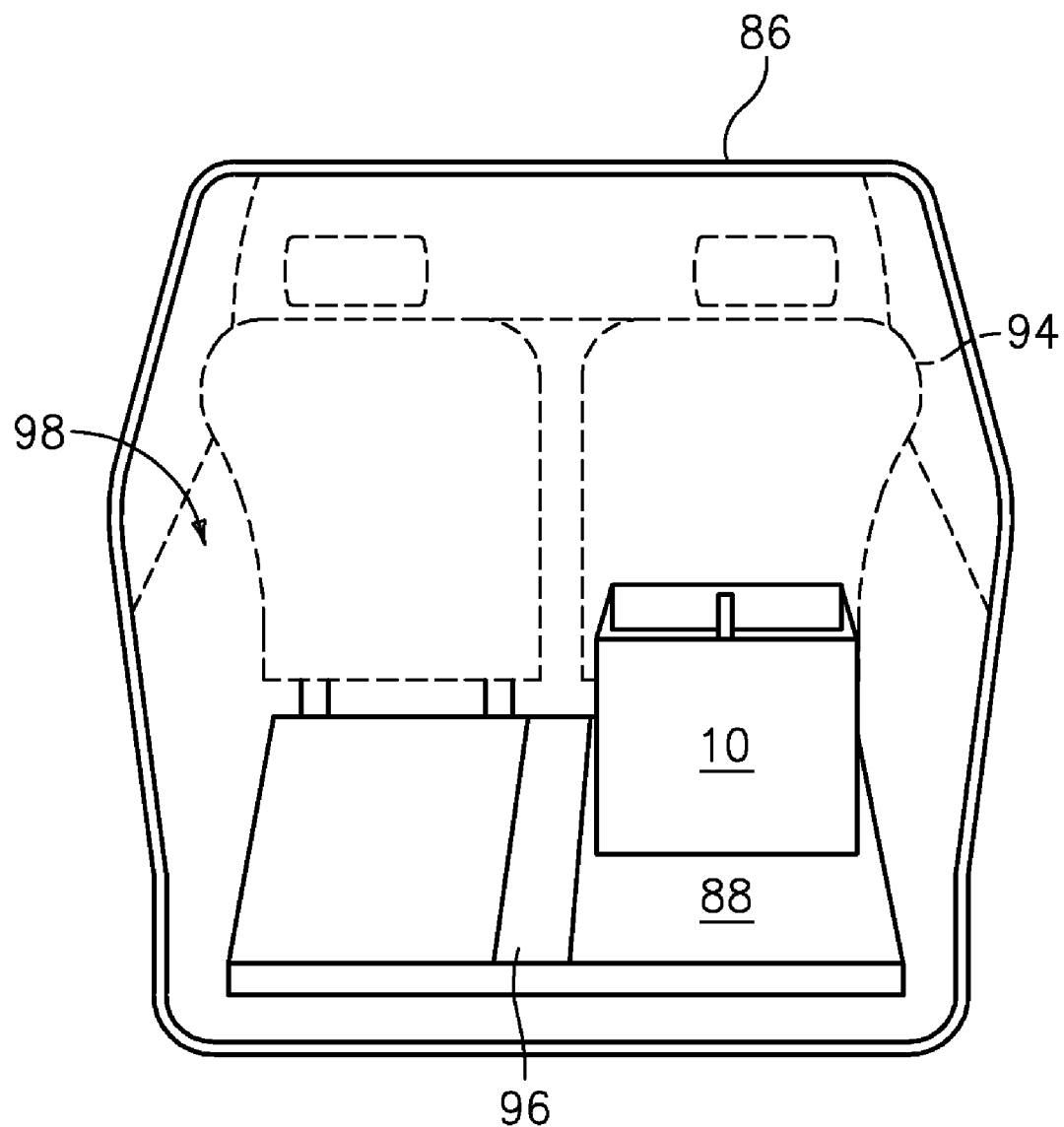
FIG. 10 is an elevation view illustration of rear seat area or cargo area of a vehicle such as the vehicle of FIG. 9.

Referring now to the illustrations of FIG. 9 and FIG. 10 the deployment of the portable device 10 on the rear floor 88 of an automobile vehicle 86 such as a sedan, a sports utility vehicle or the like. Although these drawings and the description herein reference deployment on a rear floor 88 of an automobile, such as found in a sedan, the portable device 10 could also be deployed using a rear seat 90 or a trunk 92. Alternatively, the portable device may also be deployed using a rear cargo area of a vehicle such as a van or sport utility vehicle. It should be appreciated that the rear door of the vehicle 86 illustrated in FIG. 9 has been removed for clarity.

Space on the rear floor 88 of a vehicle 86 presents a number of constraints on the portable device 10. The portable device 10 must be sized to fit within constraints such as the rear seat 90 and the front seat 94 so as to limit the width of the portable device 10. In the exemplary embodiment, the width of housing 12 is less than 7 inches. The front seat 94 is typically angled to provide comfort and structural support for a front seat passenger. As such, the front seat 94 vertically constrains the height of the portable device 10. In the exemplary embodiment, the height of the portable device 10 is less than 18 inches. Further, in many automobile vehicles 86, the length of the portable device 10 may be constrained by an elevated portion 96 typically located in the center of the car to allow a drive train to pass from the engine to the rear wheels of the vehicle. In the exemplary embodiment, the width of the housing 12 of portable device 10 is less than 15 inches. It should be appreciated that other dimensions may be more appropriate provided that portable device 10 remains sized to fit within the desired transportation area 98 in a vehicle without causing damage or unnecessary wear to the vehicle.

Figure 11:
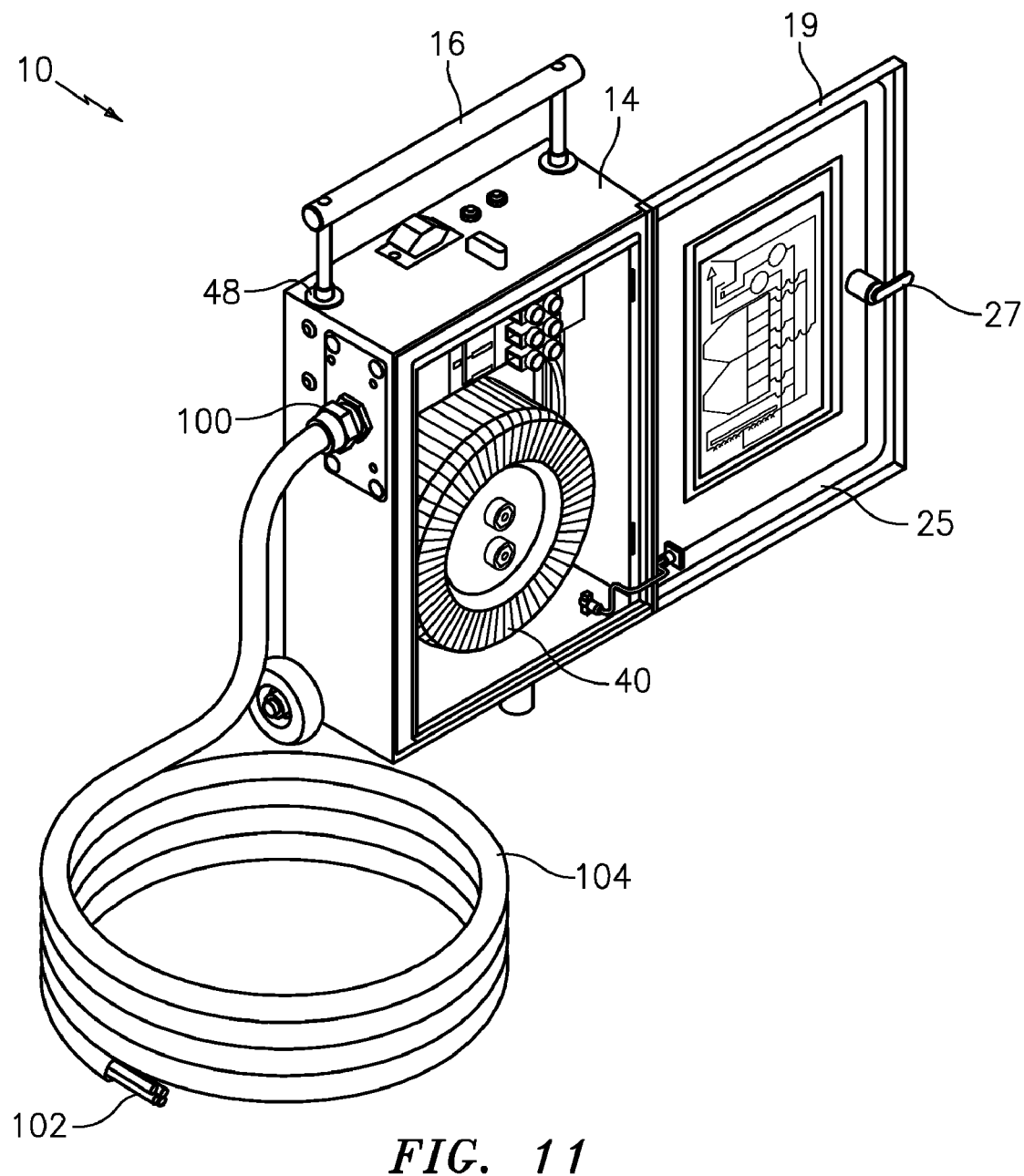
FIG. 11 is a perspective view illustration of another embodiment of a portable two-phase electrical generation device with the door open; and, FIG. 12 is a front plan view illustration of the portable two-phase electrical generation device of FIG. 11.
Figure 12:
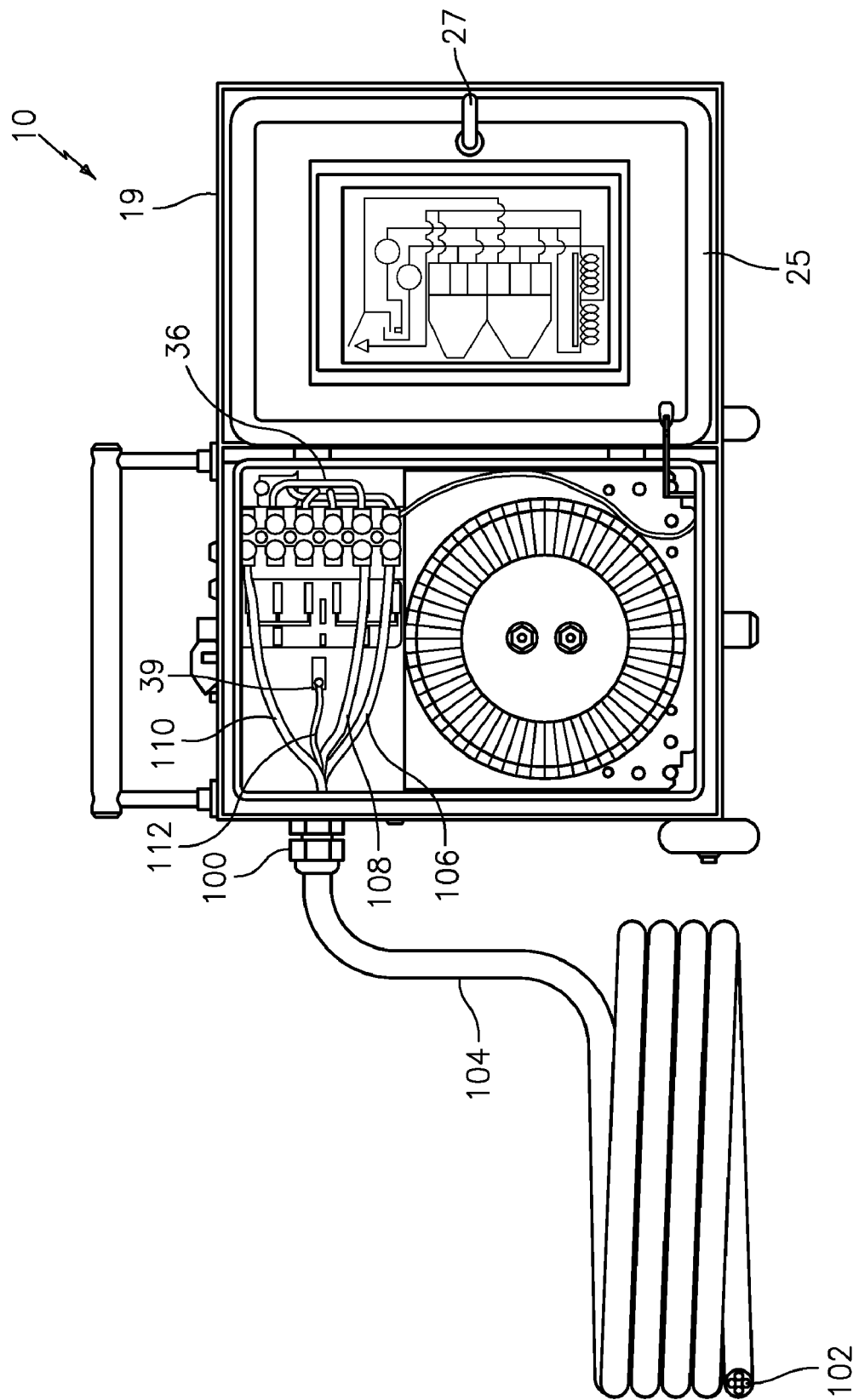

Another embodiment of a portable device 10 is illustrated in FIG. 11 and FIG. 12. In this embodiment, the housing 12 has a single pass-through fitting 100. The fitting 100 is sized to receive all of the cables 102 contained within a single insulated sheath 104. In the exemplary embodiment, the each of the plurality of input pass-through fittings 28 is an IEC 60309 cable connector, such as model PG29 manufactured by Nante for example The sheath 104 allows a single water tight entry for the cables 102, eliminating the need for multiple fittings. In one embodiment, the cables 102 include an A-phase line cable 106, a Neutral-line cable 108, and a B-phase load cable 110 that couple to the terminal block 36. The sheath 104 also incorporates a ground cable 112 that couples to a ground lug 39. These cables 102 when arranged in this manner, provides a replacement B-phase power output that can be connected to the building electrical circuits or load.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A portable device for generating two electrical phases from a single phase, said portable device comprising:
   a housing sized and of an appropriate weight to be carried by a single person;
   a handle movably coupled to said housing;
   a first and second phase inputs mounted within said housing;
   a toroidal transformer mounted within said housing, said toroidal transformer being electrically coupled to said first and second phase inputs; and,
   a switch electrically coupled to said first and second phase inputs.

2. The portable device of claim 1 further comprising:
   an at least one cable inlet coupled to said housing;
   an at least one cable outlet coupled to said housing;
   wherein said at least one cable inlet and said at least one cable outlet form a watertight seal when cable is inserted through one of said at least one inlet or said at least one cable outlet.

3. The portable device of claim 2 further comprising:
   at least one visual indicator on a first end of said housing; and
   wherein said switch is mounted said first end of said housing adjacent said at least one visual indicator.

4. The portable device of claim 3 wherein:
   said handle is arranged a first distance from said first end; and,
   said switch and said at least one visual indicator are arranged between said handle and said first end.

5. The portable device of claim 4 further comprising:
   a lever rotatably coupled to said first end; and
   a slide movably coupled to said lever;
   wherein said handle includes a handle portion and at least one arm coupled between said handle portion and said housing, said slide being operably coupled to said at least one arm.

6. The portable device of claim 1 wherein said housing further includes:
   an opening on a side of said housing adjacent said first and second phase inputs;
   a flange disposed about said opening; and,
   a door member coupled to said side, said door member having a seal arranged to cooperate with said flange when said door member is in a closed position.

7. The portable device of claim 1 further comprising at least one wheel coupled to a second end of said housing, wherein said second end is opposite said handle.

8. A portable device for generating two electrical phases from a single phase, said portable device comprising:
   a housing sized and of an appropriate weight to be carried by a single person, said housing having a first end, a second end opposite said first end and a side with an opening;
   a handle having a handle portion and an arm, said arm being movably coupled to said housing adjacent said first end;
   a wheel coupled to said second end;
   a plurality of phase inputs mounted within said housing adjacent said opening;
   a toroidal transformer mounted within said housing, said toroidal transformer being electrically coupled to said plurality of phase inputs; and,
   a plurality of phase outputs mounted within said housing adjacent said opening and electrically coupled to said toroidal transformer opposite said plurality of phase inputs.

9. The portable device of claim 8 wherein:
   said opening includes a flange about a periphery of said opening, said flange extending from said side;
   a door member is disposed over said opening, said door member including a recessed area sized to received said flange, said recessed area including a gasket; and, wherein said gasket and said flange cooperate to form a watertight seal.

10. The portable device of claim 9 wherein said door member includes means for securing said door member to said housing.

11. The portable device of claim 8 further comprising:

a lever rotatably coupled to said first end; and, a slide operably movably coupled between said lever and said arm;

wherein said handle portion is movable between a first position and a second position in response to said lever being rotated.

12. The portable device of claim 8 further comprising a switch coupled to said first end and electrically coupled to said plurality of phase inputs.

13. The portable device of claim 12 further comprising at least one visual indicator mounted to said first end and electrically coupled to said switch.

14. The portable device of claim 13 wherein said switch and said at least one visual indicator are arranged between said handle portion and said first end.

15. The portable device of claim 8 wherein said portable device has a weight of less than 65 lbs.

16. The portable device of claim 15 wherein said housing is sized to fit on a rear seat of a vehicle.

17. The portable device of claim 8 wherein said housing has a width of less than 7 inches.

18. The portable device of claim 17 wherein said housing has a height of less than 18 inches.

19. The portable device of claim 18 wherein said housing has a length of less than 15 inches.

* * * * *